United States Patent
Orlando et al.

(10) Patent No.: US 7,093,446 B2
(45) Date of Patent: *Aug. 22, 2006

(54) GAS TURBINE ENGINE HAVING IMPROVED CORE SYSTEM

(75) Inventors: Robert Joseph Orlando, West Chester, OH (US); Kattalaicheri Srinivasan Venkataramani, West Chester, OH (US); Ching-Pang Lee, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 176 days.

This patent is subject to a terminal disclaimer.

(21) Appl. No.: 10/941,508

(22) Filed: Sep. 15, 2004

(65) Prior Publication Data

US 2006/0053804 A1  Mar. 16, 2006

(51) Int. Cl.
*F02C 6/08* (2006.01)

(52) U.S. Cl. .............. 60/782; 60/247; 60/792; 60/39.38

(58) Field of Classification Search ............ 60/226.1, 60/262, 263, 269, 782, 785, 726, 806, 247, 60/268, 773, 792, 39.162, 795, 39.38, 39.76
See application file for complete search history.

(56) References Cited

U.S. PATENT DOCUMENTS

| | | | | |
|---|---|---|---|---|
| 3,673,802 A | * | 7/1972 | Krebs et al. ............. | 60/226.1 |
| 3,705,492 A | * | 12/1972 | Vickers .................. | 60/39.511 |
| 3,877,219 A | | 4/1975 | Hagen .................... | 60/39.38 |
| 3,986,347 A | * | 10/1976 | Schirmer ................. | 60/772 |
| 4,296,599 A | * | 10/1981 | Adamson ................. | 60/39.23 |
| 4,896,499 A | * | 1/1990 | Rice ....................... | 60/792 |
| 5,579,631 A | * | 12/1996 | Chen et al. .............. | 60/775 |
| 5,782,076 A | * | 7/1998 | Huber et al. ............. | 60/782 |
| 5,802,841 A | * | 9/1998 | Maeda .................... | 60/784 |
| 5,960,625 A | | 10/1999 | Zdvorak, Sr. ............ | 60/39.34 |
| 6,089,010 A | * | 7/2000 | Gross ..................... | 60/782 |
| 6,298,656 B1 | * | 10/2001 | Donovan et al. ......... | 60/39.182 |
| 6,453,659 B1 | * | 9/2002 | Van Liere et al. ....... | 60/39.53 |
| 6,481,212 B1 | * | 11/2002 | Priestley ................. | 60/782 |
| 6,487,863 B1 | * | 12/2002 | Chen et al. .............. | 607/782 |
| 6,532,744 B1 | * | 3/2003 | Reiter et al. ............ | 60/782 |
| 6,536,205 B1 | * | 3/2003 | Sugishita et al. ........ | 60/39.52 |
| 6,574,966 B1 | * | 6/2003 | Hidaka et al. ........... | 60/806 |
| 6,584,779 B1 | * | 7/2003 | Priestley ................. | 60/782 |
| 6,691,503 B1 | * | 2/2004 | Tiemann .................. | 60/39.17 |
| 6,775,986 B1 | * | 8/2004 | Ganz et al. .............. | 60/773 |

(Continued)

*Primary Examiner*—William Rodriguez
(74) *Attorney, Agent, or Firm*—William Scott Andes; James P. Davidson, Esq.

(57) ABSTRACT

A gas turbine engine having a longitudinal centerline axis therethrough, including: a fan section at a forward end of the gas turbine engine including at least a first fan blade row connected to a drive shaft; a booster compressor positioned downstream of the fan section including a plurality of stages, where each stage includes a stationary compressor blade row and a rotating compressor blade row connected to the drive shaft and interdigitated with the stationary compressor blade row; and, a combustion system for producing pulses of gas having increased pressure and temperature of a fluid flow provided to an inlet thereof so as to produce a working fluid at an outlet. A first source of compressed air from the booster compressor is provided to the combustion system inlet and a second source of compressed air from the booster compressor is provided to cool the combustion system, where the pressure of the compressed air from the second source has a greater pressure than that of the compressed air from the first source.

27 Claims, 3 Drawing Sheets

U.S. PATENT DOCUMENTS

| | | | |
|---|---|---|---|
| 6,817,187 B1* | 11/2004 | Yu | 60/774 |
| 6,840,049 B1* | 1/2005 | Ziegner | 60/782 |
| 2003/0000222 A1* | 1/2003 | Tsuji | 60/785 |
| 2003/0046938 A1* | 3/2003 | Mortzheim et al. | 60/782 |
| 2003/0101727 A1* | 6/2003 | Yamanaka et al. | 60/726 |
| 2004/0040309 A1* | 3/2004 | Ziegner | 60/772 |
| 2004/0088995 A1* | 5/2004 | Reissig | 60/772 |
| 2004/0112057 A1* | 6/2004 | Bruck et al. | 60/723 |
| 2004/0123583 A1* | 7/2004 | Nordeen et al. | 60/226.1 |
| 2004/0123602 A1* | 7/2004 | Bunker et al. | 60/782 |
| 2005/0000205 A1* | 1/2005 | Sammann et al. | 60/226.1 |

* cited by examiner

GAS TURBINE ENGINE HAVING IMPROVED CORE SYSTEM

BACKGROUND OF THE INVENTION

The present invention relates generally to an improved gas turbine engine design and, in particular, to an improved core system which replaces the high pressure system of conventional gas turbine engines A booster compressor of the gas turbine engine is utilized in a manner so as to mitigate various effects of such improved core system and thereby retain a conventional low pressure turbine design.

It is well known that typical gas turbine engines are based on the ideal Brayton Cycle, where air is compressed adiabatically, heat is added at constant pressure, the resulting hot gas is expanded in a turbine, and heat is rejected at constant pressure. The energy above that required to drive the compression system is then available for propulsion or other work. Such gas turbine engines generally rely upon deflagrative combustion to burn a fuel/air mixture and produce combustion gas products which travel at relatively slow rates and relatively constant pressure within a combustion chamber. While engines based on the Brayton Cycle have reached a high level of thermodynamic efficiency by steady improvements in component efficiencies and increases in pressure ratio and peak temperature, further improvements are becoming increasingly more difficult to obtain.

Although the combustors utilized in the conventional gas turbine engine are the type where pressure therein is maintained substantially constant, improvements in engine cycle performance and efficiency have been obtained by operating the engine so that the combustion occurs as a detonation in either a continuous or pulsed mode. Several pulse detonation system designs, for example, have been disclosed by the assignee of the present invention in the following patent applications: (1) "Pulse Detonation Device For A Gas Turbine Engine," having Ser. No. 10/383,027; (2) "Pulse Detonation System For A Gas Turbine Engine," having Ser. No. 10/405,561; (3) "Integral Pulse Detonation System For A Gas Turbine Engine" having Ser. No. 10/418,859; (4) "Rotating Pulse Detonation System For A Gas Turbine Engine" having Ser. No. 10/422,314; and, (5) "Rotary Pulse Detonation System With Aerodynamic Detonation Passages For Use In A Gas Turbine Engine" having Ser. No. 10/803,293.

It will be appreciated that a pulse detonation device produces pulses of hot gas that are of approximately the same pressure. Time averaged pressure of such pulses is similar in magnitude to the pressure generated in a typical low pressure turbine engine, but at a higher temperature than normally associated with the low pressure turbine engine. It will be understood that a constant volume combustor similarly produces pulses of high-pressure, high-temperature gas that can also be utilized in the pulse detonation type of arrangement. An example of a stationary constant volume combustor is disclosed in U.S. Pat. No. 3,877,219 to Hagen, while a constant volume combustor including a rotatable element is disclosed in U.S. Pat. No. 5,960,625 to Zdvorak, Sr.

In this way, the core or high pressure system of the conventional gas turbine engine may be replaced with a more efficient and less complicated system involving primarily the combustor. At the same time, the modified gas turbine engine will be able to retain the conventional low pressure turbine, as well as the conventional operability characteristics thereof.

Accordingly, it would be desirable for a practical overall architecture be developed for a gas turbine engine utilizing a pulse detonation device or a constant volume combustor in the core system to further improve overall engine efficiency. Further, it would be desirable for such architecture to incorporate a cooling system and method which mitigates the pulsing nature of the combustion discharge and reduces engine noise.

BRIEF SUMMARY OF THE INVENTION

In a first exemplary embodiment of the invention, a gas turbine engine having a longitudinal centerline axis therethrough is disclosed as including: a fan section at a forward end of the gas turbine engine including at least a first fan blade row connected to a drive shaft; a booster compressor positioned downstream of the fan section including a plurality of stages, where each stage includes a stationary compressor blade row and a rotating compressor blade row connected to the drive shaft and interdigitated with the stationary compressor blade row; and, a combustion system for producing pulses of gas having increased pressure and temperature from a fluid flow provided to an inlet thereof so as to produce a working fluid at an outlet. A first source of compressed air from the booster compressor is provided to the combustion system inlet and a second source of compressed air from the booster compressor is provided to cool the combustion system, where the pressure of the compressed air from the second source has a greater pressure than that of the compressed air from the first source.

In a second exemplary embodiment of the invention, a method of cooling a combustion system of a gas turbine engine including a booster compressor having a plurality of stages, wherein the combustion system produces pulses of gas having increased pressure and temperature from a fluid flow provided thereto, is disclosed as including the steps of providing a first source of compressed air from the booster compressor to an inlet of the combustion system and providing a second source of compressed air from the booster compressor to cool the combustion system, wherein pressure of the compressed air from the second source is greater than pressure of the compressed air from the first source by a predetermined amount.

In accordance with a third embodiment of the invention, a gas turbine engine is disclosed as including: a compressor at a forward end of the gas turbine engine having a plurality of stages, where each stage includes a stationary compressor blade row and a rotatable blade row connected to a drive shaft and interdigitated with the first compressor blade row; a combustion system for producing pulses of gas having increased pressure and temperature of a fluid supplied to an inlet thereof so as to produce a working fluid at an outlet; a turbine downstream of and in flow communication with the combustion system for powering the drive shaft; and, a load connected to the drive shaft. A first source of compressed air from the compressor is provided to an inlet of the combustion system and a second source of compressed air from the compressor is provided to cool the combustion system, where the pressure of the compressed air from the second source has a greater pressure than that of the compressed air from the first source. An alternative combustion system may include a rotatable member which drives the compressor via a first drive shaft, with the turbine separately driving the load by means of a second drive shaft.

In accordance with a fourth embodiment of the present invention, a gas turbine engine having a longitudinal centerline axis therethrough is disclosed as including: a fan section at a forward end of the gas turbine engine including at least a first fan blade row connected to a drive shaft; a booster compressor positioned downstream of the fan section including a plurality of stages, each stage including a stationary compressor blade row and a rotating compressor blade row connected to the drive shaft and interdigitated with the stationary compressor blade row; a combustion system for producing pulses of gas having increased pressure and temperature from a fluid flow provided to an inlet thereof so as to produce a working fluid at an outlet; and, a low pressure turbine downstream of and in flow communication with the combustion system which powers the drive shaft. A first source of compressed air from the booster compressor is provided to the combustion system inlet and a second source of compressed air from the booster compressor is provided at a forward end of the low pressure turbine so as to mitigate effects of the gas pulses thereon.

DETAILED DESCRIPTION OF THE INVENTION

Figure 1:
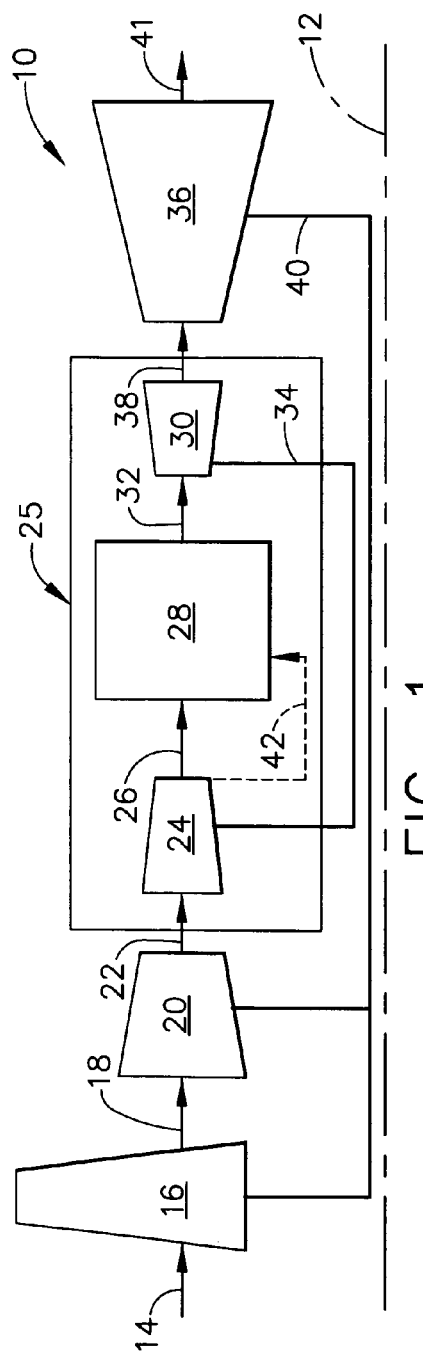
FIG. 1 is a diagrammatic view of a gas turbine engine configuration including a prior art core system, where a system of cooling is depicted therein.

Referring now to the drawings in detail, wherein identical numerals indicate the same elements throughout the figures, FIG. 1 diagrammatically depicts a conventional gas turbine engine 10 (high bypass type) utilized with aircraft having a longitudinal or axial centerline axis 12 therethrough for reference purposes. A flow of air (represented by arrow 14) is directed through a fan section 16, with a portion thereof (represented by arrow 18) being provided to a booster compressor 20. Thereafter, a first compressed flow (represented by arrow 22) is provided to a core or high pressure system 25.

More specifically, core system 25 includes a high pressure compressor 24 which supplies a second compressed flow 26 to a combustor 28. It will be understood that combustor 28 is of the constant pressure type which is well known in the art. A high pressure turbine 30 is positioned downstream of combustor 28, which receives gas products (represented by arrow 32) produced by combustor 28 and extracts energy therefrom to drive high pressure compressor 24 by means of a first or high pressure drive shaft 34. It will further be understood that high pressure compressor 24 not only provides second compressed flow 26 to an inlet of combustor 28, but also provides a cooling flow (represented by dashed arrow 42) to combustor 28.

A low pressure turbine 36 is located downstream of core system 25 (i.e., high pressure turbine 30), where gas products (represented by arrow 38) flow therein and energy is extracted to drive booster compressor 20 and fan section 16 via a second or low pressure drive shaft 40. The remaining gas products (represented by arrow 41) then exit gas turbine engine 10. It will be appreciated that fan section 16 generally includes at least one row of fan blades connected to second drive shaft 40. It will also be understood that booster compressor 20 and high pressure compressor 24 typically include a plurality of stages, where each stage of booster compressor 20 includes a stationary compressor blade row and a rotating compressor blade row connected to second drive shaft 40 and interdigitated with the stationary compressor blade row.

Figure 2:
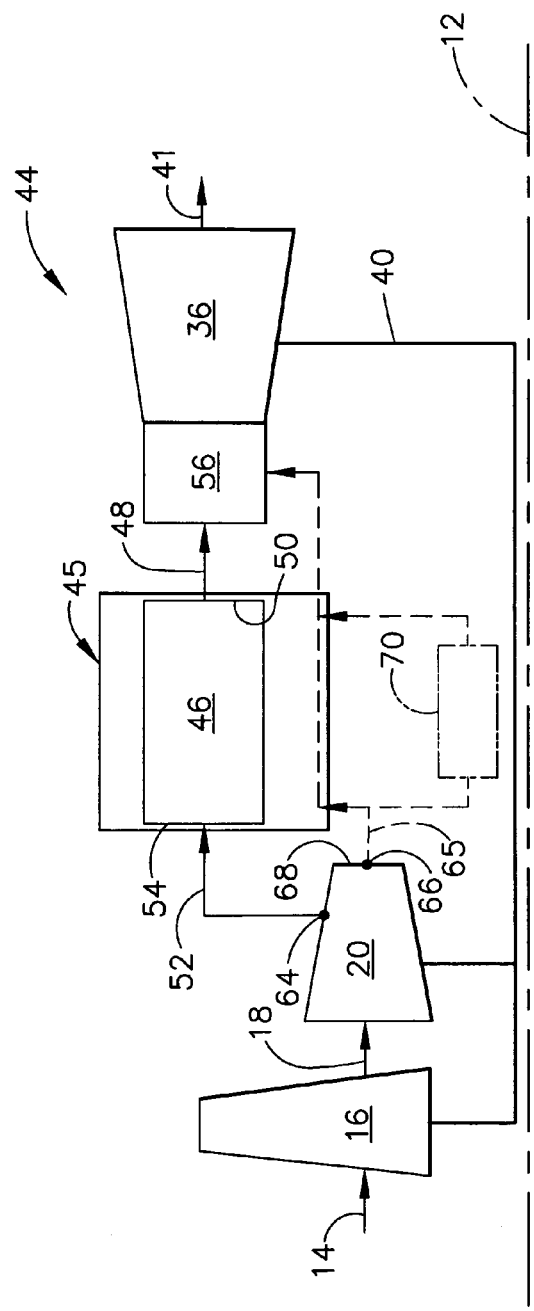
FIG. 2 is a diagrammatic view of a gas turbine engine configuration including a core system with a stationary combustion device in accordance with the present invention, where a system of cooling is shown as being integrated therewith.

As seen in FIG. 2, gas turbine engine 44 similarly includes longitudinal centerline axis 12, air flow 14 to fan section 16, air flow 18 to booster compressor 20, and low pressure drive shaft 40 through which low pressure turbine 36 drives fan section 16 and booster compressor 20. Gas turbine engine 44, however, includes a new core system 45 which primarily involves a combustion system 46. Combustion system 46, which may be either a constant volume type combustor or a pulse detonation system, produces a working fluid (represented by arrow 48) consisting of gas pulses at an exit 50 having increased pressure and temperature compared to an air flow (represented by arrow 52) supplied to an inlet 54 thereof. Contrary to combustor 28 utilized in core system 25 described hereinabove, combustion system 46 does not maintain a relatively constant pressure therein. Moreover, core system 45 operates substantially according to an ideal Humphrey cycle instead of the ideal Brayton cycle in core system 25.

It will be seen that working fluid 48 is preferably provided to a turbine nozzle 56 positioned immediately upstream of low pressure turbine 36 so as to direct their flow at an optimum orientation into low pressure turbine 36. In the embodiment depicted in FIG. 2, combustion system 46 is stationary so that low pressure turbine 36 necessarily drives both fan section 16 and booster compressor 20 by means of drive shaft 40. In an alternative configuration depicted in FIG. 3, it will be noted that combustion system 58 includes at least one rotatable member associated therewith which operates a first drive shaft 60 that drives booster compressor 20. Consequently, low pressure turbine 36 is able to separately drive fan section 16 via a second drive shaft 62.

Figure 3:
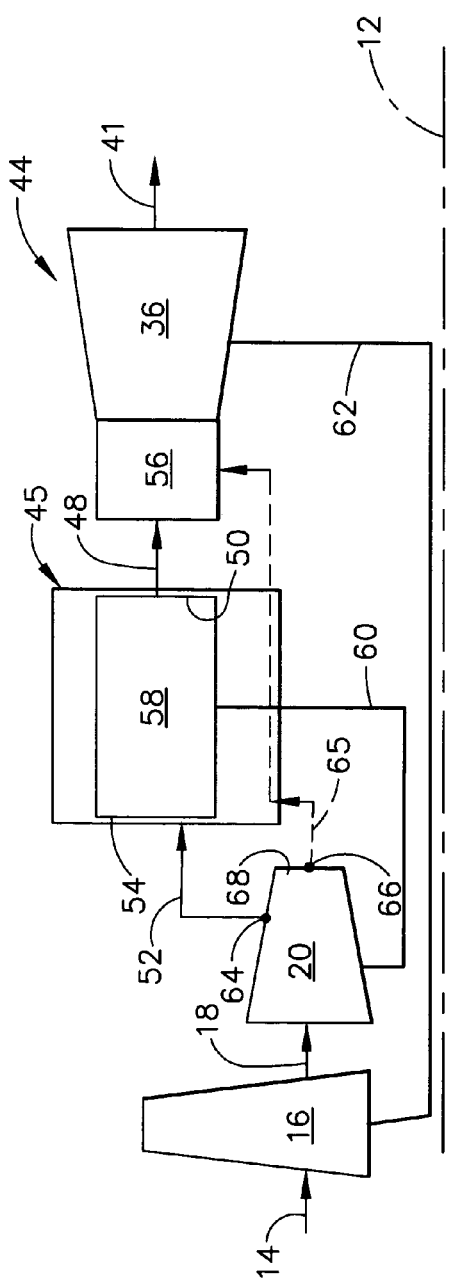
FIG. 3 is a diagrammatic view of the gas turbine engine configuration depicted in FIG. 2 including a core system with a rotating combustion device in accordance with the present invention, where a system of cooling is shown as being integrated therewith.

Further, it will be seen from FIGS. 2 and 3 that a first source 64 from booster compressor 20 provides compressed air 52 to inlet 54 of combustion systems 46 and 58, while a second source 66 from booster compressor 20 preferably provides compressed air 65 to turbine nozzle 56 in order to attenuate the pulsating nature of working fluid 48 and reduce the temperature thereof to an acceptable level for low pressure turbine 36. In this way, any related noise is mitigated and smooth operation of gas turbine engine 44 is enabled. Second compressed air 65 also may be utilized to provide cooling to combustion systems 46 and 58, which may take the form of impingement and/or convection cooling. In addition, a small portion of second compressed air 65 may be used to provide improved atomization of fuel provided to combustion systems 46 and 58.

It will be appreciated that first compressed air source 64 preferably originates from a valve or port in booster compressor 20 which is located upstream of second compressed air source 66. Since the air from second source 66 has preferably experienced more stages of booster compressor 20 than first source 64, compressed air 65 from second source 66 will necessarily have a higher pressure than compressed air 52 from first source 64. It is preferred that the pressure of compressed air 65 from second source 66 be greater than the pressure of compressed air 52 from first source 64 by at least approximately 20%. More preferably, the pressure differential between compressed air 65 of second source 66 and compressed air 52 from first source 64 is at least approximately 50%, and optimally such pressure differential is at least approximately 100%. To effect the desired pressure differential between compressed air 52 and 65 of first and second compressed air sources 64 and 66, respectively, it is preferred that first source 64 originate between adjacent stages of booster compressor 20 and that second source 66 originate at an aft end 68 of booster compressor 20.

It will further be appreciated that compressed air 65 from second source 66 provided to turbine nozzle 56 preferably has a greater pressure than working fluid 48 provided at combustion system exit 50. In this way, such compressed air 65 is able to be introduced to combustion system 46 even though the pressure of compressed air 52 from first source 64 is increased therein. To increase the cooling effectiveness of compressed air 65 from second source 66, a heat exchanger 70 may optionally be employed in series therewith (as shown in phantom in FIG. 2).

With regard to gas turbine engine 44 and the core system 45 utilized therein, the maximum amount of thrust generated, without additional modifications, is believed to be approximately 30,000 pounds. Even so, the practical effects of substituting core system 45 for high pressure core system 25 of conventional gas turbine engine 10 include the simpler and more efficient operation of gas turbine engine 44. At the same time, the design and materials of conventional low pressure turbine 36 can be retained so that exotic, expensive materials can be avoided.

The present invention also contemplates a method of cooling combustion systems 46 and 58 of gas turbine engine 44, where booster compressor 20 includes a plurality of stages and gas pulse 48 are discharged from such combustion systems. This method includes the steps of providing compressed air 52 from first source 64 in booster compressor 20 to combustion system 46 (or combustion system 58) and providing compressed air 65 from second source 66 in booster compressor 20 to cool such respective combustion system. It will be understood that the pressure of compressed air 65 from second source 66 is greater than the pressure of compressed air 52 from first source 64 by a predetermined amount as discussed hereinabove. The method further may include the steps of originating first compressed air source 64 from a first point located between adjacent stages of booster compressor 20 and originating second compressed air source 66 from a second point located downstream of the first point. The method more specifically involves the step of providing compressed air 65 from second source 66 to either an initial stage of low pressure turbine 36 or turbine nozzle 56 as explained herein. To increase the effectiveness of compressed air 65 from second source 66, an additional step may include cooling such compressed air 65 prior to providing it to combustion systems 46 or 58 (e.g., by introducing compressed air 65 to heat exchanger 70).

Figure 4:
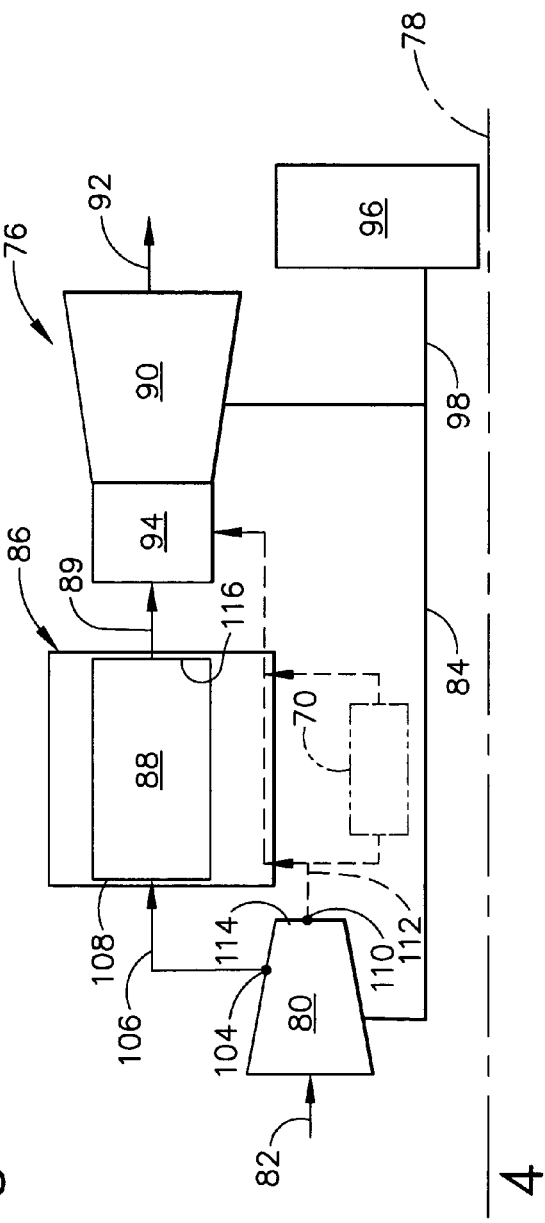
FIG. 4 is a diagrammatic view of an alternative gas turbine engine configuration including a core system with a stationary combustion device in accordance with the present invention, where a system of cooling is shown as being integrated therewith; and, FIG. 5 is a diagrammatic view of the gas turbine engine configuration depicted in FIG. 4 including a core system with a rotating combustion device in accordance with the present invention, where a system of cooling is shown as being integrated therewith.

FIG. 4 depicts an alternative gas turbine engine 76 for use in industrial and other shaft power applications (e.g., marine or helicopter propulsion) as having a longitudinal centerline axis 78. As seen therein, gas turbine engine 76 includes a compressor 80 in flow communication with a flow of air (represented by an arrow 82). Compressor 80 preferably includes at least a first stationary compressor blade row and a second compressor blade row connected to a first drive shaft 84 and interdigitated with the first compressor blade row. Additional compressor blade rows may be connected to first drive shaft 84, with additional stationary compressor blade rows interdigitated therewith. An inlet guide vane (not shown) may be positioned at an upstream end of compressor 80 to direct air flow 82 therein. A core system 86 having a stationary combustion system 88, like that described hereinabove with respect to FIG. 2, provides a working fluid 89 of gas pulses to a low pressure turbine 90 that powers first drive shaft 84. Combustion gases (represented by an arrow 92) then exit from low pressure turbine 90 and are exhausted.

It will be seen that working fluid 89 are preferably provided to a turbine nozzle 94 positioned immediately upstream of low pressure turbine 90 so as to direct their flow at an optimum orientation into low pressure turbine 90. In the embodiment depicted in FIG. 4, low pressure turbine 90 necessarily drives both compressor 80 by means of first drive shaft 84 and a load 96 by means of a second drive shaft 98. In an alternative configuration depicted in FIG. 5, it will be noted that combustion system 100 includes at least one rotatable member associated therewith which operates a first drive shaft 102 that drives compressor 80. Consequently, low pressure turbine 90 is able to separately drive load 96 via second drive shaft 98.

Figure 5:
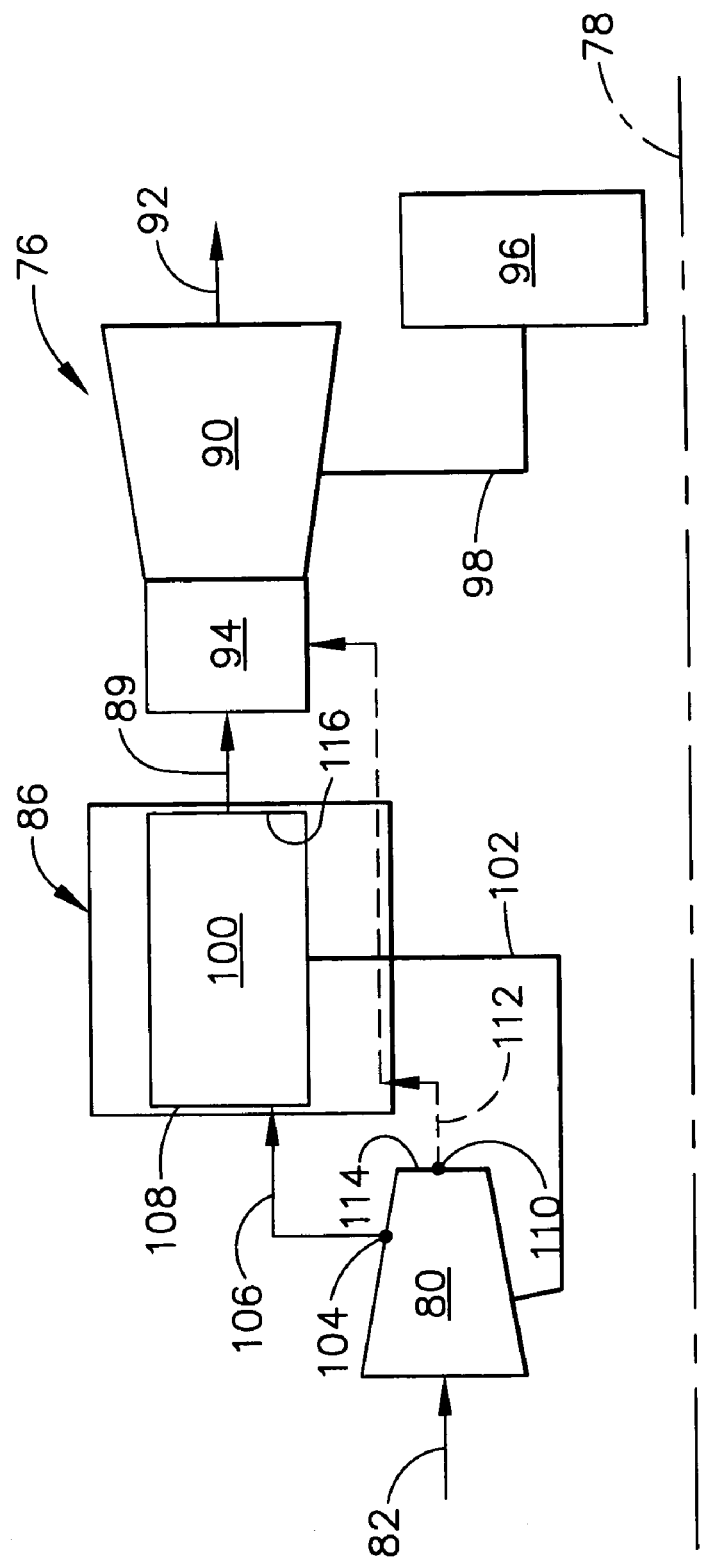

Further, it will be seen from FIGS. 4 and 5 that a first source 104 from compressor 80 provides compressed air 106 to inlet 108 of combustion systems 88 and 100, while a second source 110 from compressor 80 preferably provides compressed air 112 to turbine nozzle 94 in order to attenuate the pulsating nature of working fluid 89 and reduce the temperature thereof to an acceptable level for low pressure turbine 90. In this way, any related noise is mitigated and smooth operation of gas turbine engine 76 is enabled. Second compressed air 112 also may be utilized to provide cooling to combustion systems 88 and 100, which may take the form of impingement and/or convection cooling. In addition, a small portion of second compressed air 112 may be used to provide improved atomization of fuel provided to combustion systems 88 and 100.

It will be appreciated that first compressed air source 104 preferably originates from a valve or port in compressor 80 which is located upstream of second compressed air source 110. Since the air from second source 110 has preferably experienced more stages of compressor 80 than first source 104, compressed air 112 from second source 110 will necessarily have a higher pressure than compressed air 106 from first source 104. It is preferred that the pressure of compressed air 112 from second source 110 be greater than the pressure of compressed air 106 from first source 104 by at least approximately 20%. More preferably, the pressure differential between compressed air 112 of second source 110 and compressed air 106 from first source 104 is at least approximately 50%, and optimally such pressure differential is at least approximately 100%. To effect the desired pressure differential between compressed air 106 and 112 of first and second compressed air sources 104 and 110, respectively, it is preferred that first source 104 originate between adjacent stages of compressor 80 and that second source 110 originate at an aft end 114 of compressor 80.

It will further be appreciated that compressed air 112 from second source 110 provided to turbine nozzle 94 preferably has a greater pressure than working fluid 89 provided at combustion system exit 116. In this way, such compressed air 112 is able to be introduced to combustion systems 88 and 100 even though the pressure of compressed air 106 from first source 104 is increased therein. To increase the cooling effectiveness of compressed air 112 from second source 110, a heat exchanger 118 may optionally be employed in series therewith (as shown in phantom in FIG. 4).

An alternative combustion system 100 is shown and described in FIG. 5 and includes a rotatable member which drives a first drive shaft 102 that causes compressor 80 to rotate. A second drive shaft 98 is separately driven by low pressure turbine 90 and connected to load 96.

Having shown and described the preferred embodiment of the present invention, further adaptations of core systems 45 and 86, and particularly combustion systems 46, 58, 88 and 100 can be accomplished by appropriate modifications by one of ordinary skill in the art without departing from the scope of the invention. Moreover, it will be understood that combustion systems 46, 58, 88 and 100 may be utilized with other types of gas turbine engines not depicted herein.

What is claimed is:

1. A gas turbine engine having a longitudinal centerline axis therethrough, comprising:
    (a) a fan section a forward end of said gas turbine engine including at least a first fan blade row connected to a drive shaft;
    (b) a booster compressor positioned downstream of said fan section including a plurality of stages, each said stage including a stationary compressor blade row and a rotating compressor blade row connected to said drive shaft and interdigitated with said stationary compressor or blade row; and,
    (c) a combustion system for producing pulses of gas having increased pressure and temperature from a fluid flow provided to an inlet thereof;
when a first source of compressed air from said booster compressor is provided to said combustion system inlet and a second source of compressed air from said booster compressor is provided to cool said combustion system.

2. The gas turbine engine of claim 1, wherein compressed air from said second source has a higher pressure than compressed air from said first source.

3. The gas turbine engine of claim 1, wherein pressure of compressed air from said second source is greater than pressure of compressed air from said first source by at least approximately 20%.

4. The gas turbine engine of claim 1, wherein pressure of compressed air from said second source is greater than pressure of compressed air from said first source by at least approximately 50% a.

5. The gas turbine engine of claim 1, wherein pressure of compressed air from said second source is greater than pressure of compressed air from said first source by at least approximately 100%.

6. The gas turbine engine of claim 1, wherein said first source of compressed air originates in said booster compressor upstream of said second source of compressed air.

7. The gas turbine engine of claim 1, wherein said first source of compressed air originates between adjacent stages of said booster compressor.

8. The gas turbine of claim 1, wherein said second source of compressed air originates at an aft end of said booster compressor.

9. The gas turbine engine of claim 1, wherein pressure of compressed air from said second source is greater than pressure of fluid at an exit end of said combustion system.

10. The gas turbine engine of claim 1, wherein said combustion system is a constant volume combustion device.

11. The gas turbine engine of claim 1, wherein sad combustion system is a pulse detonation device.

12. The gas turbine of claim 1, wherein said combustion device includes at least one rotating member for powering said drive shaft.

13. The gas turbine engine of clan 1, wherein said combustion device includes no rotating members.

14. The gas turbine engine of claim 1, further comprising a turbine downstream of and in flow communication with said combustion system which powers said drive shaft.

15. The gas turbine engine of claim 14, wherein compressed air from said second source is provided to cool fluid entering said turbine.

16. The gas turbine engine of claim 1, wherein said engine operates substantially in accordance with an ideal Humphrey cycle.

17. The gas turbine engine of claim 1, wherein said combustion system increases the pressure and temperature of said fluid therein substantially simultaneously.

18. The gas turbine engine of claim 1, wherein a portion of compressed air from said second source is supplied to said combustion system to assist atomization of fuel therein.

19. The gas turbine of claim 1, further comprising a heat exchanger in flow communication with said compressed air of said second source.

20. The gas turbine engine of claim 1, wherein said gas turbine engine is able to generate a maximum of approximately 30,000 pounds of thrust.

21. A method of cooling a combustion system of a gas turbine engine including a booster compressor having a plurality of stages, wherein said combustion system produces pulses of gas having increased pressure and temperature from a fluid flow provided thereto, comprising the following steps:
    (a) providing a first source of compressed air from said booster compressor to said combustion system; and
    (b) providing a second source of compressed air from said booster compressor to cool said combustion system;
    wherein pressure of compressed air from said second source is greater than pressure of compressed air from said first source by a predetermined amount.

22. The method of claim 21, further comprising the step of originating said first source from a first point located between adjacent stages of said booster compressor.

23. The method of claim 22, further comprising the step of originating said second source from a second point located downstream of said first point.

24. The method of claim 21, further comprising the step of providing compressed air from said second source to an initial stage of a turbine in flow communication with said combustion system.

25. The method of claim 21, further comprising the step of cooling compressed air from said second source.

26. A gas turbine engine comprising:
    (a) a compressor positioned at a forward end of said gas turbine engine having a plurality of stages, each said stage including a stationary compressor blade row and a rotatable blade row connected to a first drive shaft and interdigitated with said first compressor blade row;
    (b) a combustion system for producing pulses of gas having increased pressure and temperature from a fluid supplied to an inlet thereof;

(c) a load connected to a second drive shaft; and, (d) a turbine downstream of and in flow communication with said combustion system for powering said first and second drive shafts;

wherein a first source of compressed air from said compressor is provided to said combustion system inlet and a second source of compressed air from said compressor is provided to cool said combustion system.

27. A gas turbine engine having a longitudinal centerline therethrough, comprising:

(a) a fan section at a forward end of said gas turbine engine including at least a first fan blade row connected to a drive shaft;

(b) a booster compressor positioned downstream of said fan section including a plurality of stages, each said stage including a stationary compressor blade row and a rotating compressor Wade row connected to said drive shaft and interdigitated with said stationary compressor blade row;

(c) a combustion system for producing pulses of gas having increased pressure and temperature from a fluid flaw provided to an inlet thereof; and, (d) a low pressure turbine downstream of and in flow communication with said combustion system which powers said drive shaft;

wherein a first source of compressed air from said booster compressor is provided to said combustion system inlet and a second source of compressed air from said booster compressor is provided at a forward end of said low pressure turbine so as to mitigate effects of said gas pulses thereon.

* * * * *

UNITED STATES PATENT AND TRADEMARK OFFICE
CERTIFICATE OF CORRECTION

PATENT NO.        : 7,093,446 B2
APPLICATION NO.   : 10/941508
DATED             : August 22, 2006
INVENTOR(S)       : Robert Joseph Orlando et al.

It is certified that error appears in the above-identified patent and that said Letters Patent is hereby corrected as shown below:

Col. 7 line 27: insert --at-- after "section" and before "a" (second occurrence).

Col. 7 line 55: delete "or".

Col. 7 line 39: delete "when" and substitute --wherein--.

Col. 7 line 53: delete "50% a." and substitute --50%.--.

Col. 8 line 6: delete "sad" and substitute --said--.

Col. 8 line 11: delete "clan" and substitute --claim--.

Col 10 line 1: delete "Wade" and substitue --blade--.

Signed and Sealed this

Twenty-fourth Day of October, 2006

JON W. DUDAS
*Director of the United States Patent and Trademark Office*